UNITED STATES PATENT OFFICE.

CHARLES H. CAMPBELL, OF PHILADELPHIA, PENNSYLVANIA, ASSIGNOR TO JOSEPH H. CAMPBELL, OF NEW YORK, N. Y.

FOOD PRODUCT.

SPECIFICATION forming part of Letters Patent No. 668,253, dated February 19, 1901.

Application filed April 4, 1900. Serial No. 11,438. (No specimens.)

*To all whom it may concern:*

Be it known that I, CHARLES H. CAMPBELL, a citizen of the United States, residing in Philadelphia, in the county of Philadelphia and State of Pennsylvania, have invented a certain new and useful Improved Food Product, of which the following is a specification.

My invention provides a food of high nutritive power, being composed largely of proteids extracted in an unaltered state from milk and of the nourishing elements found in various beverage-producing beans or seeds, as in the seed of the cacao-tree, marketed in the forms of chocolate, cocoa, and broma, and in the bean or berry of the coffee-tree.

Three food products are now in common use made from the seed of the cacao-tree: chocolate, made by roasting and grinding; cocoa, made by drying and powdering the kernals of the seed and removing part of the cocoa-butter to make it somewhat more digestible than chocolate, and broma, made by thoroughly expressing the oil from the seed and then drying and powdering. The nutritive qualities of all these products and of coffee are well known, and they supplement excellently those of the milk with which I mix them to form the food which is the subject of my invention. The latter is made by condensing and evaporating skimmed milk to desiccation, preferably according to the process set forth in the application of Joseph H. Campbell for patent Serial No. 739,463, filed December 7, 1899, whereby it is maintained at so low a temperature as to preserve the milk solids in unaltered condition and so rapidly as to avoid lactic fermentation. This process in brief consists in subjecting the milk to externally-applied heat, whereby it is maintained at a temperature below the coagulating-point of albumen and simultaneously blowing air into it in such volume that it is concentrated so rapidly as to prevent souring, continuing this concentration till it becomes of a pasty consistency, and then drying the pasty product by subdividing it and exposing it to the air at a temperature below the coagulating-point of albumen until desiccated. The composition of this desiccated milk is approximately as follows: protein matter, thirty-eight; sugar of milk, 47.5; mineral matter, 6.5; water, eight; total, one hundred.

The process which I use for obtaining the protein matter in milk solids insures that the protein matter in my food product shall have the same solubility and peptogenic quality as the proteids of fresh milk. As the protein matter is by far the most difficult to obtain in a natural state in manufactured food products and as it has never been previously so obtained from milk the novelty and value of my product are apparent.

The mode of mixing the material may be varied somewhat; but I prefer to first reduce the ingredients separately to powder by grinding or otherwise and then to mix them. The final product may be marketed in the loose ground state in which coffee and cocoa are now sold or may be compressed into cakes before marketing. A more intimate mixture and a more uniform fineness of the ingredients may be obtained by mixing the ingredients before the final grinding and then grinding them together; but this is not necessary where the final product is to be subsequently made into a beverage instead of being eaten directly.

In the experiments which I have made have found that the best proportions with cocoa are approximately half and half, and the same proportion holds good for chocolate and broma, while one-quarter milk is about the best proportion for the coffee product. This is about the proportion of milk which is usually mixed with cocoa in making it into a beverage, and the cost of the latter is nearly twice that of a beverage made from my product with water alone. In the dry condition it is also a very attractive food of pleasant taste and quite digestible.

In using my product for the production of a beverage it is advisable to add the water cold and then boil and subsequently sweeten it; otherwise, if boiling water be added directly, the milk being very hard and dry a portion of the casein is rendered indigestible before the milk has time to dissolve.

The excess of protein matter in my product over that which is essential in maintaining the required balance between the tissue-forming and the fat-forming foods of the average man makes it especially adapted to supplement the fat-forming foods, which form so large a part of our diet. The fatty quality of chocolate, due to the cocoa-butter present, makes it especially adapted for mixture with my desiccated milk, which is composed almost entirely of tissue-forming ingredients, the two making a most economical food—that is, one in which the heat-producing and tissue-forming qualities are well balanced, so that there is little excess of either to go to waste or to be injurious to health. In making up my product the chocolate product is essentially the same as the cocoa product, with the additional ingredient cocoa butter. By reason of the expense it is difficult to obtain the necessary proportion of tissue-forming food, and my product provides a comparatively cheap substitute therefor. It is made in large part from a waste product—skimmed milk—and even when reduced to the necessary condition and incorporated into my product its price is but a small fraction of the price of ordinary milk, meats, or other animal foods. Also the cost of the mixture is far below that of the cacao-seed product alone. It may be shipped to points where fresh milk, and therefore a drink of coffee with milk, cocoa, or chocolate, is unobtainable. It recommends itself also on account of the facility with which it is made into a beverage or its edibility in the marketed condition. Other advantages will be apparent to those having a skilled knowledge of the art to which my invention pertains.

Though I have described the product of my invention and processes of producing the same with great detail, I am not to be understood as limiting myself to the exact product herein set forth, as various modifications thereof will be apparent to those skilled in the art of manufactured food products. For example, my product may comprise not only the coffee, cacao, and milk elements, but also an admixture of sugar or other similar ingredients well known in food compositions. Also in place of the coffee or cacao product described other ingredients which are substantial equivalents of coffee and cacao may be substituted. It will be understood, therefore, that the expression "product of the cacao-seed" includes all elements which might in the composition set forth possess the same novel points of utility.

What I claim, therefore, and desire to secure by Letters Patent, is a food product distinguished by including in its composition the following-defined elements, all substantially as set forth in the foregoing specification:

1. A food product which comprises a mixture of a product of the cacao-seed and desiccated non-fatty milk solids having their proteids in approximately as soluble and peptogenic condition as in normal milk.

2. A food product which comprises a mixture of cocoa and desiccated non-fatty milk solids having their proteids in approximately as soluble and peptogenic condition as in normal milk.

3. A food product which comprises a dry powdered mixture of cocoa and desiccated non-fatty milk solids having their proteids in approximately as soluble and peptogenic condition as in normal milk.

In witness whereof I have hereunto signed my name in the presence of two subscribing witnesses.

CHARLES H. CAMPBELL.

Witnesses:
D. A. USINA,
GEORGE H. FRASER.